United States Patent [19]  [11] 4,238,536
Koch et al.  [45] Dec. 9, 1980

[54] PREVENTING WATER INCURSION INTO COMMODITY PILES

[75] Inventors: Ronney R. Koch; Roger F. Rensvold, both of Duncan, Okla.

[73] Assignee: Halliburton Company, Duncan, Okla.

[21] Appl. No.: 935,225

[22] Filed: Sep. 14, 1978

Related U.S. Application Data

[63] Continuation-in-part of Ser. No. 374,192, Jun. 27, 1973, abandoned.

[51] Int. Cl.$^3$ .............................................. B05D 1/02
[52] U.S. Cl. .................................... 427/421; 106/227; 106/239; 414/133; 427/154; 427/155; 427/156; 427/221; 428/497
[58] Field of Search ............... 427/155, 154, 156, 421; 427/221; 264/DIG. 72; 106/227, 239; 414/133; 478/497

[56] References Cited

U.S. PATENT DOCUMENTS

| 2,204,781 | 6/1940 | Wattles | 264/DIG. 72 X |
| 2,332,623 | 10/1943 | Clare | 106/227 X |
| 2,845,361 | 7/1958 | Maddox | 106/239 X |
| 2,854,347 | 9/1958 | Booth et al. | 427/154 |
| 4,087,572 | 5/1978 | Nimerick | 427/154 X |

Primary Examiner—Shrive P. Beck
Attorney, Agent, or Firm—John H. Tregoning; Robert S. Nisbett; C. Clark Dougherty, Jr.

[57] ABSTRACT

A pile of a commodity such as coal is coated with a composition which forms a continuous gel thereon whereby water incursion into the pile is prevented. The composition is comprised of a liquid hydrocarbon having a viscosity greater than about 50 centipoises at 75° F. and a minimum boiling point greater than about 500° F. gelled with an alkaline earth metal salt of rosin acid.

32 Claims, No Drawings

PREVENTING WATER INCURSION INTO COMMODITY PILES

CROSS REFERENCES TO RELATED APPLICATIONS

This application is a continuation-in-part of U.S. patent application Ser. No. 374,192 filed June 27, 1973 and now abandoned.

Various particulate solid commodities which are water sensitive such as coal, lignite, limestone, grains and tailings from mining operations are stored in piles or transported in a manner whereby they are exposed to atmospheric elements such as rain and melting snow. For example, in the operation of electric power generating plants which utilize coal as fuel and other similar industrial facilities, a reserve supply of coal is maintained to insure the continuous operation of the facilities. Commodities such as grains are often stored or transported in open containers whereby they are subjected to atmospheric elements which have a deteriorating effect on their value.

When water from rain or other forms of precipitation precolates into coal piles, it reacts with sulfide ores mixed with the coal. The heat generated by such reaction cannot readily dissipate, and consequently, the temperature of the coal rises to the point where spontaneous ignition of the coal occurs, often causing severe problems. Additionally, clays mixed with the coal swell when contacted by water, and when the water swollen clays are burned in furnaces, slag is formed making excessive maintenance of the furnaces necessary.

Depending upon the particular commodity stored or transported, water percolating through the commodity brings about various adverse effects. For example, tailings and other commodities containing water soluble or reactive materials form acids and other pollutants which find their way into streams and rivers.

Many procedures have heretofore been used to prevent water incursion into commodity piles. For example, tarpaulins or other coverings have been utilized to prevent water incursion, but because such coverings readily fail due to weathering or tearing, they have often proven to be unsatisfactory. Melted solid materials such as melted paraffin wax oil have been applied to commodity piles so that upon solidification of the melt, a protective coating is formed on the piles. However, because the solidified coating formed lacks flexibility, the expansion and contraction of the material being protected can cause the coating to crack and allow water incursion. Also, because the apparatus for heating and applying melts must be relatively elaborate, such methods are expensive to carry out. Other methods whereby the piles are covered with protective coatings have been developed and used, but have either been ineffective or expensive.

By the present invention, a method of simply and economically coating a commodity pile with a gelled composition which is flexible and which effectively prevents water incursion into the pile is provided.

In accordance with the method of the present invention, a protective coating is formed on a pile of a commodity such as coal or grain by combining a liquid hydrocarbon having a viscosity of greater than about 50 cps at 75° F. and a minimum boiling point of greater than about 500° F. with a rosin, one or more alkaline earth metal compounds and water to ionize the alkaline earth metal compounds to form a flowable liquid composition which rapidly forms into a flexible highly viscous gel. Immediately after the liquid composition is formed it is introduced onto the commodity pile so that the pile is covered with the highly viscous gel. Because the gel is flexible, movement of the commodity pile from expansion, contraction or other action does not disturb the continuity of the protective coating formed.

A variety of liquid hydrocarbons can be utilized in accordance with this invention including mixtures of saturated, unsaturated, aliphatic, aromatic and other hydrocarbon compounds. The liquid hydrocarbon should have a viscosity such that it will flow at atmospheric temperatures. Preferably, the liquid hydrocarbon has a viscosity at 75° F. of greater than 50 cps, and more preferably, of greater than about 300 cps. The most preferred viscosity is from about 300 to about 500 cps at 75° F. Liquid hydrocarbons of such viscosity have the ability to maintain particulate filler materials in suspension while still remaining flowable. In addition, it is preferred that the liquid hydrocarbon have a minimum boiling point of greater than about 500° F., and most preferably, greater than about 600° F. so that the vapor pressure of the liquid hydrocarbon is sufficiently low that excessive vaporization of the liquid hydrocarbon after it is formed into a gel does not occur. If the liquid hydrocarbon utilized has too high a vapor pressure, the gel formed therewith will shrink and crack as the liquid hydrocarbon evaporates.

A particularly preferred liquid hydrocarbon for forming coatings on commodities which are to be combusted for fuel or other purpose is a mixture of saturated aliphatic and aromatic hydrocarbons having a viscosity of 142 SUS at 100° F. and a minimum boiling point of 610° F. at 760 mm Hg. When coatings are formed on grain or other commodity for human or animal consumption in accordance with this invention, the liquid hydrocarbon utilized is an edible oil such as corn oil.

Rosins which are suitable for use in accordance with this invention contain rosin acids of the abietic and primaric acid types as the chief constituent. Such rosins are generally classified as gum rosin, wood rosin or tall oil rosin. Gum rosin is the residue obtained after the distillation of turpentine oil from the oleorosin tapped from living trees. Wood rosin is obtained by extracting pine stump with naphtha and distilling off the volatile fractions. Tall oil rosin is a byproduct of the fractionation of tall oil. Such rosins are commercially available dissolved in light liquid hydrocarbons such as naphtha or kerosene; however, high concentrations of light liquid hydrocarbons should be avoided in that their presence in the gelled protective coating reduces the resistance of the coating to weathering without shrinking and cracking. Preferably, the rosin solution utilized contains no more than 25 parts by weight light hydrocarbons per 100 parts by weight rosin. A particularly preferred such rosin solution is tall oil rosin dissolved in kerosene in an amount of 80 parts by weight per 20 parts by weight kerosene.

When rosin is combined with a liquid hydrocarbon and the rosin acids contained in the rosin neutralized with alkaline earth metal ions, i.e., formed into alkaline earth metal salts, a gel having a consistency similar to heavy grease is formed. In accordance with the present invention, the alkaline earth metal ions are provided by dispersing in ionizable basic alkaline earth metal compound in the liquid hydrocarbon utilized and then dispersing therein sufficient water to ionize the alkaline earth metal compound. Examples of suitable basic alkaline earth metal compounds which can be used are calcium oxide, calcium hydroxide, magnesium hydroxide, barium hydroxide and mixtures of such compounds. In forming coatings on commodities to be combusted such as coal, lime (calcium oxide or hydrated calcium oxide) is preferred for the reasons that it is readily available and it also functions to reduce the formation of sulfur compound pollutants in the combustion gases produced.

In carrying out the method of this invention, the rosin used is combined with a liquid hydrocarbon having a viscosity of greater than about 50 cps at 75° F. and a minimum boiling point of greater than about 500° F. If the rosin is dissolved in light hydrocarbons such as kerosene, greater than about 12 and preferably greater than about 20 parts by weight of light hydrocarbons per 100 parts by weight of the heavier liquid hydrocarbon should be avoided to prevent shrinking and cracking of the protective coating formed.

The concentration of rosin dissolved in the liquid hydrocarbon controls the consistency of the gel formed. The minimum consistency of the gel should be such that it will not flow under weathering conditions and the maximum consistency should be such that the gel does not become brittle. The higher the viscosity of the liquid hydrocarbon utilized, the less rosin is required to produce a gel having the desired consistency. Preferably, the rosin is combined with the liquid hydrocarbon in an amount in the range of from about 3 to about 10 parts by weight of rosin per 100 parts by weight of liquid hydrocarbon. Most preferably, rosin is combined with the liquid hydrocarbon in an amount in the range of from about 7 to about 10 parts by weight of rosin per 100 parts by weight of liquid hydrocarbon.

After the rosin-liquid hydrocarbon mixture described above is prepared, alkaline earth metal ions are combined therewith in an amount sufficient to neutralize the rosin acids in the rosin which in turn causes the high viscosity gel to be formed. However, an excess concentration of alkaline earth metal ions is preferred to assure the gellation. Generally, the alkaline earth metal compound utilized to supply the alkaline earth metal ions is combined with the rosin-liquid hydrocarbon mixture in an amount in the range of from about 10 to about 100 parts by weight alkaline earth metal compound per 100 parts by weight of the rosin utilized.

Sufficient water is next combined with the alkaline earth metal compound-rosin-liquid hydrocarbon mixture to ionize the alkaline earth metal compound. High concentrations of water reduce the weathering resistance of the resulting gel, and therefore, water is preferably combined with the mixture in an amount of less than about 3 parts by weight water per 100 parts by weight liquid hydrocarbon.

Immediately after combining the water with the alkaline earth metal compound-rosin-liquid hydrocarbon mixture and while the mixture is flowable, it is sprayed or otherwise introduced onto the commodity pile to be protected. Because the mixture gels rapidly, it does not penetrate the commodity pile and forms a continuous highly viscous coating thereon which prevents the incursion of water into the pile.

The addition of a solid diluent to the gellable liquid hydrocarbon coating composition is often desirable. A suitable solid diluent does not interfere with the gellation mechanism of the rosin and liquid hydrocarbon and increases the volume of the composition thereby increasing the area which can be covered by the composition. The solid diluent utilized should be one which does not foul industrial furnaces or generate undesirable vapors when combusted. Examples of such suitable solid diluents include fly ash, ground silica and finely divided coal.

A preferred technique for forming a protective coating on a commodity pile in accordance with this invention is to combine a portion of the total quantity of liquid hydrocarbon to be used with the rosin to form a rosin-liquid hydrocarbon mixture. The remainder of the liquid hydrocarbon is then separately combined with the alkaline earth metal compound or compounds used and a quantity of water to ionize the alkaline earth metal compound so that an alkaline earth metal ion-liquid hydrocarbon mixture is formed. The two mixtures or components thus formed can be combined a short time before introducing the combined mixture, i.e., the resulting gellable liquid hydrocarbon composition on a commodity pile. By this technique, the rosin and alkaline earth metal ions are separated until the two mixtures are combined. When combined, a flowable alkaline earth metal ion-rosin-liquid hydrocarbon composition is produced which rapidly forms into a highly viscous gel. Most preferably, the mixtures are separately pumped to a single spray nozzle wherein they are combined and then sprayed onto the commodity pile. Because of the rapid gellation of the combined composition, the viscosity of the composition immediately increases upon contacting the commodity pile thereby preventing the composition from percolating into the commodity pile and forming a continuous flexible water resistant coating thereon. If a solid diluent is used in the composition, it can be added to both of the component mixtures before the mixtures are combined to form the gellable composition.

The following example is presented to further illustrate the method of the present invention.

EXAMPLE 1

A gellable liquid hydrocarbon composition comprising 100 parts by weight liquid hydrocarbon, 15.8 parts by weight tall oil rosin dissolved in 8.5 parts by weight kerosene, 70.3 parts by weight fly ash, 2.8 parts by weight hydrated lime, and 2.1 parts by weight water is tested as a coating composition on a simulated coal pile. Parts by weight as used in this example is parts by weight per 100 parts by weight liquid hydrocarbon. The simulated coal pile consists of a $23'' \times 23'' \times 1''$ layer of ground limestone having an average particle diameter of about $\frac{3}{4}''$ with 1–12 mesh sand filling the voids between the ground limestone particles. This layer is held at a 30° angle from horizontal while placing the coating composition on the simulated coal pile to simulate placing the coating composition on the side of a coal pile.

This gellable liquid hydrocarbon composition is formulated in two component parts. The first component part is prepared by homogeneously mixing 873.97 grams liquid hydrocarbon having a viscosity of about 300 at 75° F. and a minimum boiling point of about 500° F. with 368 grams tall oil rosin dissolved in 198 grams kerosene and 866.85 grams fly ash. The second component part is prepared by homogeneously mixing 1,455.58 grams of the liquid hydrocarbon used for preparing the first component part with 65.36 grams hydrated lime, then with 48.96 grams water, and finally with 772.89 grams fly ash. The first and second component parts are homogeneously mixed to produce the gellable liquid hydrocarbon coating composition and the coating composition is sprayed on the simulated coal pile. The coating composition is sprayed through a flat-fan nozzle held about 6" to 12" from the surface and moved across the surface to produce the coating on the simulated coal pile. The coating composition flows a short distance on the surface of the simulated coal pile before gelling. However, the coating composition does not percolate into the coal pile.

The simulated coal pile is coated with 2,651 grams of the coating composition to produce a calculated coating thickness of 0.32 inch. The coating is a smooth protective coating which has resistance to weathering and prevents incursion of water into the pile.

It will be readily apparent to those skilled in the art that many widely different emodiments of this invention can be made without departing from the spirit and scope thereof. Therefore, this invention is to be limited only by the lawful scope of the appended claims.

What is claimed is:

1. A method of forming a protective coating on a commodity pile whereby water incursion into the pile is prevented comprising:

combining a liquid hydrocarbon having a viscosity greater than about 50 cps at 75° F. and a minimum boiling point greater than about 500° F. with rosin, an alkaline earth metal compound and water to form a flowable alkaline earth metal ion-rosin-liquid hydrocarbon mixture which rapidly converts into a highly viscous gel; and immediately thereafter introducing said mixture onto the surface of said commodity pile so that said mixture forms a highly viscous protective coating on said pile.

2. The method of claim 1 wherein said liquid hydrocarbon has a viscosity within the range of from about 300 cps to about 500 cps at 75° F.

3. The method of claim 1 wherein said rosin is combined with said liquid hydrocarbon in an amount in the range of from about 3 to about 10 parts by weight rosin per 100 parts by weight liquid hydrocarbon.

4. The method of claim 3 wherein said alkaline earth metal compound is selected from the group consisting of calcium oxide, calcium hydroxide, barium hydroxide, magnesium hydroxide and mixtures thereof.

5. The method of claim 4 wherein said alkaline earth metal compound is lime.

6. The method of claim 4 wherein said alkaline earth metal compound is combined with said liquid hydrocarbon in an amount in the range of from about 10 to about 100 parts by weight alkaline earth metal compound per 100 parts by weight rosin combined therewith.

7. The method of claim 6 wherein said water is combined with said liquid hydrocarbon in an amount of less than about 3 parts by weight water per 100 parts by weight liquid hydrocarbon.

8. The method of claim 1 wherein said alkaline earth metal ion-rosin-liquid hydrocarbon mixture is further characterized to include a solid diluent which does not interfere with the gellation of said mixture.

9. The method of claim 8 wherein said solid diluent is fly ash.

10. A method of forming a protective coating on a commodity pile whereby water incursion into the pile is prevented comprising:

(a) combining a portion of a liquid hydrocarbon having a viscosity greater than about 50 cps at 75° F. and a minimum boiling point of greater than about 500° F. with rosin to form a rosin-liquid hydrocarbon mixture;

(b) combining the remainder of said liquid hydrocarbon with an alkaline earth metal compound and water to form an alkaline earth metal ion-liquid hydrocarbon mixture;

(c) combining said rosin-liquid hydrocarbon mixture with said alkaline earth metal ion-liquid hydrocarbon mixture to form a flowable composition which rapidly converts into a highly viscous gel; and (d) immediately thereafter introducing said composition onto said commodity pile so that said composition forms a continuous highly viscous gel thereon.

11. The method of claim 10 wherein said rosin-liquid-hydrocarbon mixture and said alkaline earth metal ion-liquid hydrocarbon mixture are combined in accordance with step (c) by separately pumping said mixtures to a spray nozzle, and said composition is introduced onto said commodity pile in accordance with step (d) by spraying it thereon.

12. The method of claim 11 wherein said rosin-liquid hydrocarbon mixture and said alkaline earth metal ion-liquid hydrocarbon mixture are each further characterized to include solid diluent mixed therewith.

13. The method of claim 12 wherein said diluent is fly ash.

14. The method of claim 10 wherein said liquid hydrocarbon has a viscosity within the range of from about 300 cps to about 500 cps at 75° F.

15. The method of claim 10 wherein said rosin is combined with said portion of liquid hydrocarbon in accordance with step (a) in an amount in the range of from about 3 to about 10 parts by weight per 100 parts by weight of the total quantity of liquid hydrocarbon utilized.

16. The method of claim 15 wherein said alkaline earth metal compound is selected from the group consisting of calcium oxide, calcium hydroxide, barium hydroxide, magnesium hydroxide and mixtures thereof.

17. The method of claim 16 wherein said alkaline earth metal compound is lime.

18. The method of claim 16 wherein said alkaline earth metal compound is combined with the remainder of said liquid hydrocarbon in accordance with step (b) in an amount in the range of from about 10 to about 100 parts by weight alkaline earth metal compound per 100 parts by weight rosin utilized in accordance with step (a).

19. The method of claim 18 wherein said water is combined with said remainder of said liquid hydrocarbon in accordance with step (b) in an amount of less than 3 parts by weight water per 100 parts by weight of the total quantity of liquid hydrocarbon utilized.

20. A method of forming a protective coating on a commodity pile whereby water incursion into the pile is prevented comprising:

(a) combining rosin with a portion of a liquid hydrocarbon having a viscosity in the range of from about 300 to about 500 cps at 75° F. and a minimum boiling point of about 500° F. in an amount in the range of from about 7 to about 10 parts by weight rosin per 100 parts of the total quantity of liquid hydrocarbon used to form a rosin-liquid hydrocarbon mixture;

(b) combining calcium oxide and water with the remainder of said liquid hydrocarbon to form a calcium ion-liquid hydrocarbon mixture, said calcium oxide being combined with said remaining liquid hydrocarbon in an amount in the range of from about 10 to about 100 parts by weight per 100 parts by weight of rosin utilized in step (a) and said water being combined with said remaining liquid hydrocarbon in an amount of less than 3 parts by weight per 100 parts by weight of the total liquid hydrocarbon utilized;

(c) combining said rosin-liquid hydrocarbon mixture with said alkaline earth metal ion-liquid hydrocarbon mixture to form a flowable composition which rapidly converts into a highly viscous gel; and (d) immediately thereafter introducing said composition onto said commodity pile so that said composition forms a continuous highly viscous gel thereon.

21. The method of claim 20 wherein said rosin-liquid-hydrocarbon mixture and said alkaline earth metal ion-liquid hydrocarbon mixture are combined in accordance with step (c) by separately pumping said mixture to a spray nozzle, and said composition is introduced onto said commodity pile in accordance with step (d) by spraying it thereon.

22. The method of claim 21 wherein said rosin-liquid-hydrocarbon mixture and said alkaline earth metal ion-liquid hydrocarbon mixture are each further characterized to include solid diluent mixed therewith.

23. The method of claim 22 wherein said diluent is fly ash.

24. In a method of forming a protective coating on a commodity pile wherein said coating is introduced onto said pile in a liquid state and thereafter hardens, the improvement comprising:

combining a liquid hydrocarbon having a viscosity greater than about 50 cps at 75° F. and a minimum boiling point greater than about 500° F. with rosin, an alkaline earth metal compound and water to form a flowable alkaline earth metal ion-rosin-liquid hydrocarbon mixture which rapidly converts into a highly viscous gel; and immediately thereafter introducing said mixture onto the surface of said commodity pile so that said mixture forms a highly viscous flexible protective coating on said pile.

25. The method of claim 24 wherein said liquid hydrocarbon has a viscosity within the range of from about 300 cps to about 500 cps at 75° F.

26. The method of claim 24 wherein said rosin is combined with said liquid hydrocarbon in an amount in the range of from about 3 to about 10 parts by weight rosin per 100 parts by weight liquid hydrocarbon.

27. The method of claim 26 wherein said alkaline earth metal compound is selected from the group consisting of calcium oxide, calcium hydroxide, barium hydroxide, magnesium hydroxide and mixtures thereof.

28. The method of claim 27 wherein said alkaline earth metal compound is lime.

29. The method of claim 27 wherein said alkaline earth metal compound is combined with said liquid hydrocarbon in an amount in the range of from about 10 to about 100 parts by weight alkaline earth metal compound per 100 parts by weight rosin combined therewith.

30. The method of claim 29 wherein said water is combined with said liquid hydrocarbon in an amount of less than about 3 parts by weight water per 100 parts by weight liquid hydrocarbon.

31. The method of claim 24 wherein said alkaline earth metal ion-rosin-liquid hydrocarbon mixture is further characterized to include a solid diluent which does not interfere with the gellation of said mixture.

32. The method of claim 31 wherein said solid diluent is fly ash.

* * * * *